Feb. 17, 1925.

B. A. KARR 1,526,912

SHOCK ABSORBER

Filed Aug. 3, 1921

INVENTOR
BURTON A. KARR
BY
*Hazard & Miller*
ATTORNEYS.

Patented Feb. 17, 1925.

1,526,912

UNITED STATES PATENT OFFICE.

BURTON A. KARR, OF OCEAN PARK, CALIFORNIA, ASSIGNOR TO KARR MANUFACTURING COMPANY, OF LOS ANGELES, CALIFORNIA.

SHOCK ABSORBER.

Application filed August 3, 1921. Serial No. 489,476.

*To all whom it may concern:*

Be it known that I, BURTON A. KARR, a citizen of the United States, residing at Ocean Park, in the county of Los Angeles and State of California, have invented new and useful Improvements in Shock Absorbers, of which the following is a specification.

My invention relates to a shock absorbing device particularly intended for use on motor vehicles, the principal object of my invention being to generally improve upon and simplify the construction of the existing forms of motor vehicle shock absorbers, and to provide a relatively simple and efficient construction wherein the resiliency of air under pressure is combined with yielding resistance members in the form of springs for counteracting, absorbing and eliminating the shocks and vibrations developed by the passage of the wheels of the vehicle over uneven portions of a roadway.

Further objects of my invention are to provide a shock absorbing device that is capable of being easily and cheaply produced, and which will be advantageously employed on practically all makes of motor vehicles.

With the foregoing and other objects in view, my invention consists in certain novel features of construction and arrangement of parts that will be hereinafter more fully described and claimed, and illustrated in the accompanying drawings, in which—

Figure 1:
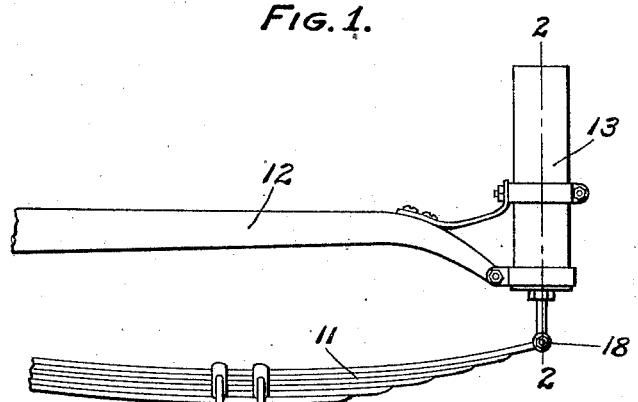
Figure 1 is a side elevational view of parts of a motor vehicle including an axle, a semi-elliptic spring, and a portion of the vehicle frame, and showing my improved shock absorber interposed between said spring and frame.
Figure 2:
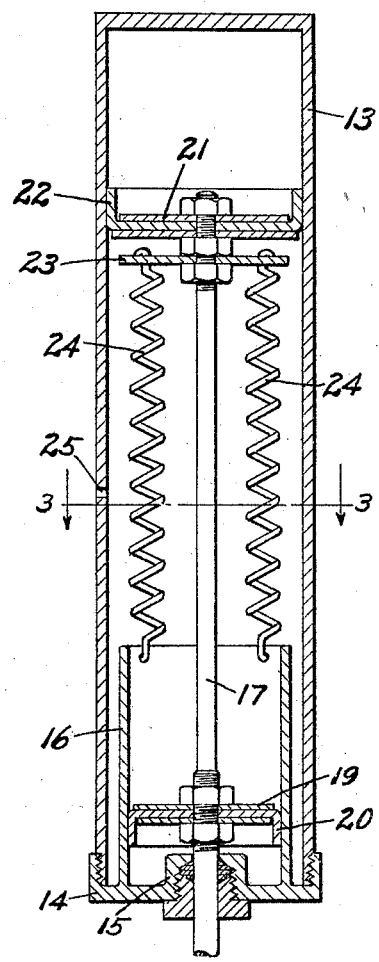
Fig. 2 is an enlarged vertical section taken on the line 2—2 of Fig. 1.
Figure 3:
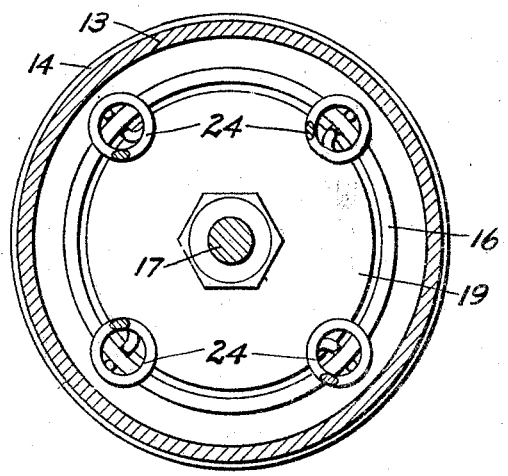
Fig. 3 is an enlarged horizontal section taken on the line 3—3 of Fig. 2.

Referring by numerals to the accompanying drawings, which illustrate a practical embodiment of my invention, 10 designates the axle of a vehicle, 11 the semi-elliptic spring that is positioned upon said axle, and 12 one of the side rails of the motor vehicle frame.

My improved shock absorber includes a hollow cylinder 13 that occupies a vertical position adjacent to the end of the side rail 12, and being readily fixed to said rail in any suitable manner. The lower end of the cylinder 13 is closed by a removable cap 14 in the center of which is formed a suitable stuffing box 15. Formed integral with the cap 14 and extending upwardly a short distance into the lower portion of the chamber within cylinder 13 is an annular wall 16, the diameter of which is slightly less than the diameter of cylinder 13. Arranged for movement through the stuffing box 15 is a rod 17, the lower end of which is pivotally connected as designated by 18 to the corresponding end of a semi-elliptic spring 11 secured in any suitable manner. Secured in any suitable manner to rod 17 and arranged for operation within the annular wall 16 is a piston 19 having a cup leather packing member 20, and the flange of which latter extends downwardly in the chamber within annular wall 16. Secured in any suitable manner to the upper portion of rod 17 and arranged for operation within the upper portion of the chamber in cylinder 13 is a piston 21 having a cup leather packing member 22, and the flange of which latter projects upwardly in the chamber within said cylinder 13. Secured on the upper portion of rod 17 immediately beneath the piston 21 is a crossbar 23, and secured thereto in any suitable manner are the upper ends of coil springs 24, the lower ends of the latter being connected in any suitable manner to the upper portion of annular wall 16. Formed through the wall of the cylinder 13 and at a point below the lower limit of movement of piston 21 is an aperture 25.

Under normal operating conditions air is trapped in the upper portion of cylinder 13 above piston 21, and a certain amount of air is trapped in the chamber within annular wall 16 beneath piston 19. The body of trapped air above piston 21 co-operates with the springs 24 and the semi-elliptic spring 11 in supporting the vehicle body and its load, and in the event that the wheels of the vehicle pass over a rough portion of the roadway or drop into a transverse rut the resulting shock and vibration will be absorbed by the downward movement of the cylinder 13 relative to the rod 17 and the piston 21, which movement will tend to further compress the air trapped above said piston, and on the rebound or upward movement of the vehicle frame and the cylinder 13 carried thereby the resulting shock will be absorbed by the air cushion beneath the piston 19.

There is a great advantage in using a plurality of springs, preferably four, to carry a given load, over using one spring. The shock absorber is more flexible throughout its movement, is more durable and is cheaper and easier to make.

Thus I have produced a shock absorber comprising a cylinder, a sleeve fixed within the lower end of the cylinder, an upwardly cupped piston in the upper end of the cylinder, a downwardly cupped piston in the sleeve, a rod connecting the pistons and extending downwardly below the cylinder, and means including contractile springs connecting the pistons to the cylinder, the cylinder to be connected to the bed of a vehicle and the rod to be connected to the running gear.

Thus it will be understood that I have provided a shock absorber wherein air cushions co-operate with the resiliency of coil springs and with the usual vehicle springs in absorbing and eliminating all shocks and vibrations that are produced by the travel of the vehicle wheels over rough portions of the roadway.

The shock absorbing device is relatively simple, very compact, is capable of being easily and cheaply produced, and is very effective in performing its intended functions.

It will be readily understood that minor changes in the size, form and construction of the various parts of my improved shock absorbing device may be made and substituted for those herein shown and described without departing from the spirit of my invention, the scope of which is set forth in the appended claims.

I claim as my invention:

1. A shock absorber comprising a cylinder, a sleeve within and fixedly secured to the cylinder, a piston working within the cylinder, a second piston working within the sleeve and rigidly connected to the first piston, a cross bar rigidly associated with the pistons, and coiled contractile springs connected to the cross bar and to the sleeve for resisting the movement of the pistons and the cylinder.

2. A shock absorber comprising a cylinder, a sleeve fixed within the lower end of the cylinder, an upwardly cupped piston in the upper end of the cylinder, a downwardly cupped piston in the sleeve, a rod connecting the pistons and extending downwardly below the cylinder, and means including contractile springs connecting the pistons to the cylinder, the cylinder to be connected to the bed of a vehicle and the rod to be connected to the running gear.

In testimony whereof I have signed my name to this specification.

BURTON A. KARR.